(12) United States Patent
Missoum et al.

(10) Patent No.: US 12,509,266 B2
(45) Date of Patent: Dec. 30, 2025

(54) PROCESS FOR THE PRODUCTION OF A CONTAINER FOR THE PREPARATION OF A BEVERAGE IN A BEVERAGE PREPARATION DEVICE, SEALING STATION FOR CARRYING OUT A SEALING STEP OF SAID PROCESS, AND A CONTAINER OBTAINED BY SAID PROCESS

(71) Applicant: SOCIETE DES PRODUITS NESTLE S.A., Vevey (CH)

(72) Inventors: Karim Missoum, Pusignan (FR); Nicola Galaffu, Ornex (FR); Gerhard Niederreiter, Vevey (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 18/713,291

(22) PCT Filed: Nov. 24, 2022

(86) PCT No.: PCT/EP2022/083113
§ 371 (c)(1),
(2) Date: May 24, 2024

(87) PCT Pub. No.: WO2023/094515
PCT Pub. Date: Jun. 1, 2023

(65) Prior Publication Data
US 2025/0019108 A1 Jan. 16, 2025

(30) Foreign Application Priority Data
Nov. 29, 2021 (EP) ..................... 21210930

(51) Int. Cl.
*B65B 51/10* (2006.01)
*B65B 29/02* (2006.01)
*B65D 85/804* (2006.01)

(52) U.S. Cl.
CPC ............ *B65B 51/10* (2013.01); *B65B 29/025* (2017.08); *B65D 85/8046* (2013.01)

(58) Field of Classification Search
None
See application file for complete search history.

(56) References Cited

U.S. PATENT DOCUMENTS

| 4,555,894 A * | 12/1985 | Illy ......................... B65B 9/042 53/559 |
| 2013/0108752 A1* | 5/2013 | Kollep .................... B65B 61/20 425/352 |

FOREIGN PATENT DOCUMENTS

| WO | 2020234793 | 11/2020 |
| WO | 2021161121 | 8/2021 |
| WO | 2021205269 | 10/2021 |

* cited by examiner

*Primary Examiner* — Tanzim Imam
(74) *Attorney, Agent, or Firm* — K&L Gates LLP

(57) ABSTRACT

The present invention concerns a process for producing a container for the preparation of a beverage in a beverage preparation device, wherein, in the final container obtained, at least 70% of the surface of a compacted beverage ingredient body (2) contained therein, is in contact with the container walls (3, 4).

6 Claims, 3 Drawing Sheets

PROCESS FOR THE PRODUCTION OF A CONTAINER FOR THE PREPARATION OF A BEVERAGE IN A BEVERAGE PREPARATION DEVICE, SEALING STATION FOR CARRYING OUT A SEALING STEP OF SAID PROCESS, AND A CONTAINER OBTAINED BY SAID PROCESS

CROSS REFERENCE TO RELATED APPLICATIONS

The present application is a National Stage of International Application No. PCT/EP2022/083113, filed on Nov. 24, 2022, which claims priority to European Patent Application No. 21210930.0, filed on Nov. 29, 2021, the entire contents of which are being incorporated herein by reference.

FIELD OF THE INVENTION

The present invention concerns a process for the production of a container for the preparation of a beverage in a beverage preparation device, a sealing station for carrying out a sealing step of said process, and a container obtained by said process.

BACKGROUND OF THE INVENTION

It is known to prepare beverages by using a pod containing an ingredient, in particular ground coffee, in a beverage preparation device. The known pods have a chamber, usually made by superimposing two cup shaped bodies arranged upside down with respect to each other and welded together along respective peripheral edges (as shown in FIGS. 1 and 3). The cup shaped bodies are generally—but not absolutely necessarily—identical. The known pods usually comprise an injection wall, through which water is to be introduced in the pod chamber, and which is configured to be punctured by an injection member of the beverage preparation device for circulating a fluid under pressure inside said chamber, and a beverage delivery wall, through which the beverage is to be dispensed, and which is configured to be opened upon interaction with opening elements of the beverage preparation device.

Before sealing together the peripheral edges of the two cup shaped bodies, a beverage ingredient is placed in the cup shaped delivery wall. The beverage ingredient is usually a body formed by a compacted ingredient, having a three-dimensional shape and being dimensioned such as not to completely fill the chamber delimited by the injection and delivery walls (when they are superimposed) and in such a way that a rather large headspace is provided in the chamber between said body and the internal surfaces of the injection and delivery walls (as shown in FIG. 3). In the known pods the beverage ingredient body is not in contact with the entire internal surfaces of the bodies of the injection and delivery wall, but usually it is in contact only with a limited central portion of the delivery wall. The empty space that is not filled by the compacted ingredient body, in the chamber delimited by the injection and delivery walls, is usually called the "headspace"; this term will be used in this text with this meaning.

Following an eco-responsible approach, some of the existing pods are made of paper. In such paper pods, it happens that during extraction, in addition to the openings due to the interaction of delivery wall with the beverage preparation device, cracks are formed in addition to the desired openings for the outflow of the beverage. These cracks are unwanted, because they negatively affect a correct beverage preparation, and also because from these cracks the beverage ingredient, for example ground coffee, flows out of the pod and inside a user cup.

The object of the present invention is to provide a process for the production of a container for the preparation of a beverage, a sealing station for carrying out a sealing step of said process, and a container obtained by said process which obviate the aforementioned drawbacks of existing container. In particular, it is an object of the present invention to provide a process for the production of a container for the preparation of a beverage and a container obtained by said process which improve the opening of the delivery wall of the container, avoiding the formation of unwanted cracks in said wall.

SUMMARY OF THE INVENTION

The invention as claimed in claim 1 is a process for producing a container for the preparation of a beverage in a beverage preparation device, comprising the steps of:

a. providing an injection wall of said container comprising a paper layer, said injection wall comprising: a peripheral sealing edge, and an inner portion capable of being punctured by an injection member of the beverage preparation device for circulating water under pressure inside said container;

b. providing a beverage delivery wall of said container comprising a paper layer, said delivery wall comprising: a peripheral sealing edge, and an inner portion capable of being opened by an opening member of the beverage preparation device when the pressure inside said container presses said inner portion against said opening member, to let the beverage flow out, wherein at least one, preferably both, of said inner portions of said injection and delivery walls has a cup shape;

c. placing a compacted body of beverage ingredient in the cup-shaped inner portion of the injection or delivery wall;

d. placing the injection and delivery walls one above the other such that the sealing edges of said injection and delivery walls are superimposed, in order to form a preliminary container chamber containing said ingredient body and comprising a preliminary headspace not filled by said compacted ingredient body;

e. providing a sealing station comprising: first and second housing elements forming a sealing chamber for housing the inner portions of said injection and delivery walls, wherein said first and second housing elements are configured for being moved towards each other for sealing said edges, and such that the surfaces of said sealing chamber are in contact with external surfaces of said inner portions of the injection and delivery walls.

According to the invention the process further comprises the steps of:

f. pressing said housing elements against said inner portions of the injection and delivery walls such as to form a final container chamber having a headspace reduced at least by 10%, with respect to said preliminary headspace, and such that in the final container thus obtained, at least 70% of the surface of the compacted beverage ingredient body is in contact with said injection and delivery walls;

g. sealing together the edges of the injection and delivery walls, while the inner portions of said injection and delivery walls are still pressed.

Preferably, the process provides that the inner portions of the injection and delivery walls are at least partially pressed by said housing elements until the distance between at least first opposing portions of the two inner surfaces of the first and second housing elements is at least 0.1% lower than the final thickness of corresponding first opposing portions of a finished container, and preferably at least 1% lower; and preferably, said first opposing portions are central portions of said housing elements and injection and delivery walls.

Preferably, the process provides that when the housing elements are pressed against said inner portions of the injection and delivery walls the superimposed edges of said injection and delivery walls can at least partially slide over each other.

More, preferably, the process provides that the inner portions of the injection and delivery walls are pressed by said housing elements until the maximum distance between the first opposing portions of the two inner surfaces of the first and second housing elements is at least 0.1% lower than the final maximum thickness of corresponding first opposing portions of a finished container.

Preferably, the process further provides that the inner portions of the injection and delivery walls are at least partially pressed by said housing elements until the headspace of the final container chamber is less than 5% of the total volume of said final chamber, preferably less than 3%.

The present invention also relates to a sealing station for carrying out the sealing step of the process for producing a container for the preparation of a beverage in a beverage preparation device, as described before, wherein the container comprises:
- an injection wall comprising a paper layer, said injection wall comprising: a peripheral sealing edge, and an inner portion capable of being punctured by an injection member of the beverage preparation device for circulating water under pressure inside said container;
- a beverage delivery wall comprising a paper layer, said delivery wall comprising: a peripheral sealing edge, and an inner portion capable of being opened by an opening member of the beverage preparation device when the pressure inside said container presses said inner portion against said opening member, to let the beverage flow out, wherein at least one, preferably both, of said inner portions of said injection and delivery walls has a cup shape;
- a compacted body of beverage ingredient housed in a container chamber formed by placing the injection and delivery walls one above the other such that the sealing edges of said injection and delivery walls are superimposed, wherein said container chamber before sealing said sealing edges together comprises a preliminary headspace not filled by said compacted ingredient body.

According to the invention the sealing station comprises:
first and second housing element forming a sealing chamber for housing the inner portion of said injection and delivery walls wherein said first and second housing elements are configured for being moved towards each other for sealing said edges, and such that the surfaces of this sealing chamber press the external surfaces of the inner portions of the injection and delivery walls,
wherein at least one of the inner surfaces of the first and/or second housing elements comprise a portion projecting towards the inside of the sealing chamber delimited by the housing elements and increasing the pressure exerted by the surfaces of said first and second housing elements on the external surfaces of the inner portions of the injection and delivery walls, such as to form a final container chamber having a headspace reduced at least by 10%, with respect to said preliminary headspace, and such that in the final container thus obtained, at least 70% of the surface of the compacted beverage ingredient body is in contact with said injection and delivery walls.

Preferably, the projecting portion of the sealing station is provided only at the inner surface of the first housing element which houses the delivery wall.

Preferably, the projecting portion of the sealing station is provided only at a central portion of the surface of one or both the housing elements.

Preferably, the projecting portion of the sealing station has a disc shape having a diameter comprised between 10% and 80%, more preferably about 65%, the diameter of the housing elements.

Preferably, the projecting portion of the sealing station has a height comprised between 0.5 mm and 2 mm, more preferably about 1 mm.

Preferably, the projecting portion of the sealing station has a diameter comprised between 5 mm and 30 mm, more preferably about 25 mm.

Preferably, the first and second housing elements of the sealing station are dimensioned in such a way that, during the sealing of the edges of the injection and delivery walls, the distance between at least first opposing portions of the two inner surfaces of the first and second housing elements is at least 0.1% lower than the final thickness of corresponding first opposing portions of a finished container, and preferably at least 1% lower, wherein, preferably the distance between at least first opposing portions of the two inner surfaces of the first and second housing elements is the maximum distance between the two inner surfaces of the first and second housing elements and said final thickness of the container is the final maximum thickness of the container.

The present invention also relates to a container for the preparation of a beverage in a beverage preparation device, obtained by a process as described before, and/or a sealing station as described before, comprising a chamber in which a beverage ingredient is stored, said chamber being delimited:
- by an injection wall, through which a fluid, preferably water, is to be introduced in the container, wherein said injection wall is configured to be punctured by an injection member of the beverage preparation device for circulating said fluid under pressure inside said chamber; and
- by a beverage delivery wall, through which the beverage is to be dispensed out of the container, wherein said beverage delivery wall is configured to be opened upon interaction with opening elements of the beverage preparation device under the effect of rising pressure of said fluid being injected into said chamber;
wherein the injection and the delivery walls comprise sealing portions for sealingly connecting said injection and the delivery walls together;
wherein the beverage ingredient is a body formed by a compacted ingredient dimensioned in such a way that at least a headspace is provided in the chamber between said body and the internal surfaces of the injection and delivery walls;
wherein the injection and delivery walls comprise a paper layer.

According to the invention the inner surface of at least said delivery wall, and preferably also the inner surface of the injection wall, is continuously in contact with the outer surface of the beverage ingredient body except for a terminal portion of said injection and delivery walls located at the sealing portions.

Preferably, the paper layer of the injection and delivery walls of the container it is made of a sulfurized paper, having intrinsic oxygen barrier features.

Preferably, the paper layer of the injection and delivery walls of the container is a formable paper layer, which can be stretched and deformed for obtaining a requested shape, preferably a cup shape, for the injection and delivery walls.

Preferably, the paper layer of the injection and delivery walls of the container has a weight comprised between 50 g/m2 and 200 g/m2, more preferably comprised between 70 g/m2 and 150 g/m2.

Preferably, the injection and delivery walls of the container form an oxygen barrier for the beverage ingredient stored in said chamber.

Preferably, the container is a single use coffee pod.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
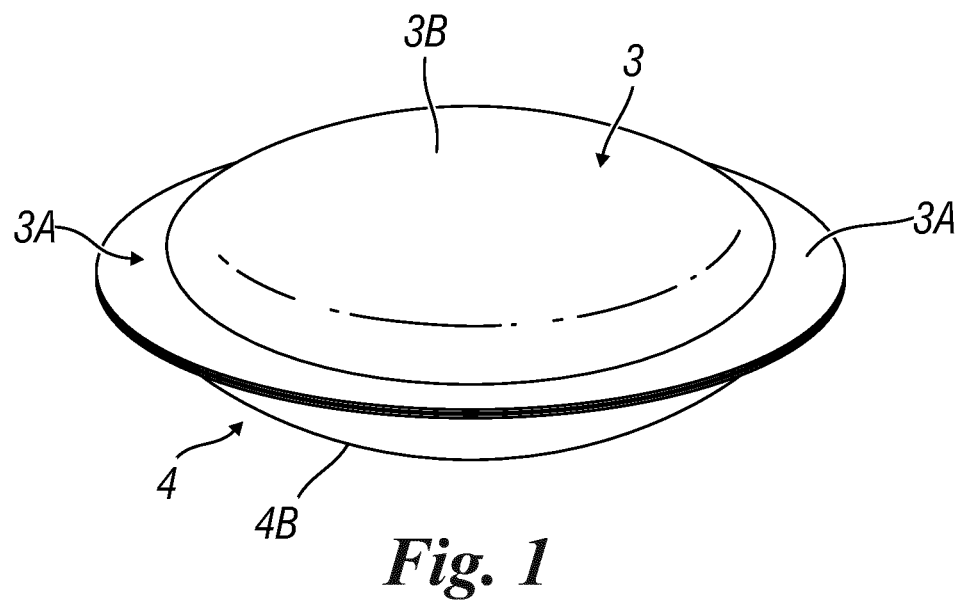
FIG. 1 is a schematic perspective view of a container usual for the skilled person.

The figures illustrate a container for use in a beverage preparation device (not shown but usual for the skilled person) comprising a chamber 1 in which a beverage ingredient 2 is stored. The chamber 1 is delimited: by an injection wall 3, comprising a peripheral sealing edge 3A and an inner portion 3B through which a fluid, preferably water, is to be introduced in the container, and which is configured to be punctured by an injection member of the beverage preparation device for circulating said fluid under pressure inside said chamber, and by a beverage delivery wall 4 of the container, comprising a peripheral sealing edge 4A and an inner portion 4C through which the beverage is to be dispensed, and which is configured to be opened upon interaction with opening elements of the beverage preparation device (e.g. a puncturing or tearing interaction) under the effect of rising pressure of said fluid being injected into said chamber.

The peripheral sealing edges 3A, 4A are configured for sealingly connecting the injection and delivery walls 3, 4.

The injection and delivery walls 3, 4 form an oxygen barrier for the beverage ingredient 2 stored in the chamber 1.

The beverage ingredient is a body 2 formed by a compacted ingredient, having a three-dimensional shape and being shaped and dimensioned such as not to completely fill the chamber 1. Therefore, in the chamber 1 there is at least one headspace 6 (FIG. 4) between the body 2 of the compacted ingredient and the internal surfaces of the injection and delivery walls 3, 4.

According to the invention, the injection and delivery walls 3, 4 comprise a paper layer.

According to the invention, the inner surface of at least the delivery wall 4, and preferably also the inner surface of the injection wall 3, is continuously in contact with the outer surface of the beverage ingredient body 2, except for a short terminal portion 4F, 3F of said walls 3, 4 located at the sealing edges 3A, 4A.

This short terminal portion 4F, 3F of the delivery and injection walls 4, 3 preferably has a dimension between 1 mm and 10 mm.

Thanks to the facts: that the headspace 6 in the chamber 1 is very limited, that this headspace 6 is preferably provided substantially only at the edges 3A, 4A, and that the delivery wall 4 is almost entirely in contact with the beverage ingredient (which forms a sort of "cushion"), it has been verified that in the delivery wall 4 no cracks are formed during the beverage outflow, and that the beverage flows out only through the openings which are formed by the interaction of the delivery wall 4 with the opening elements of the beverage preparation device.

Figure 3:
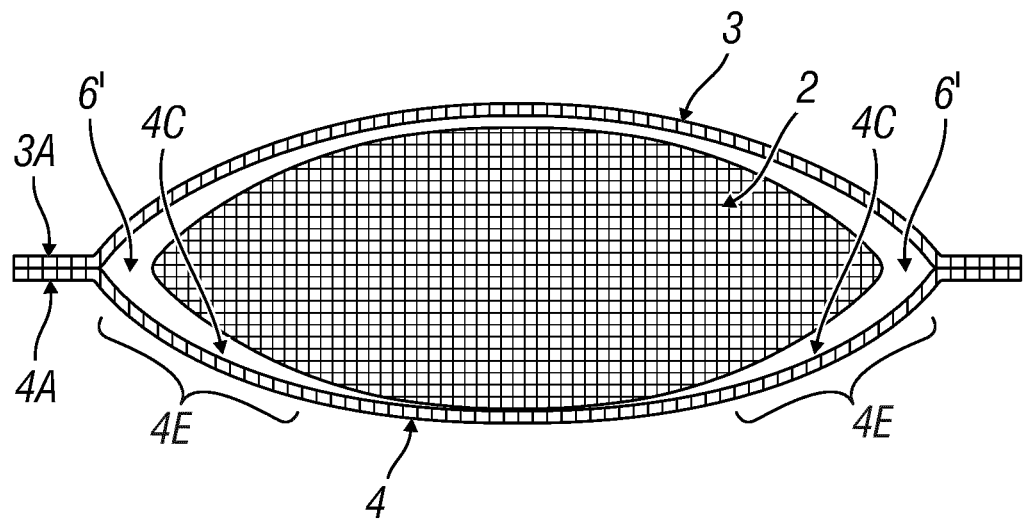
FIG. 3 is a schematic cut view of the container of FIG. 1.
Figure 4:
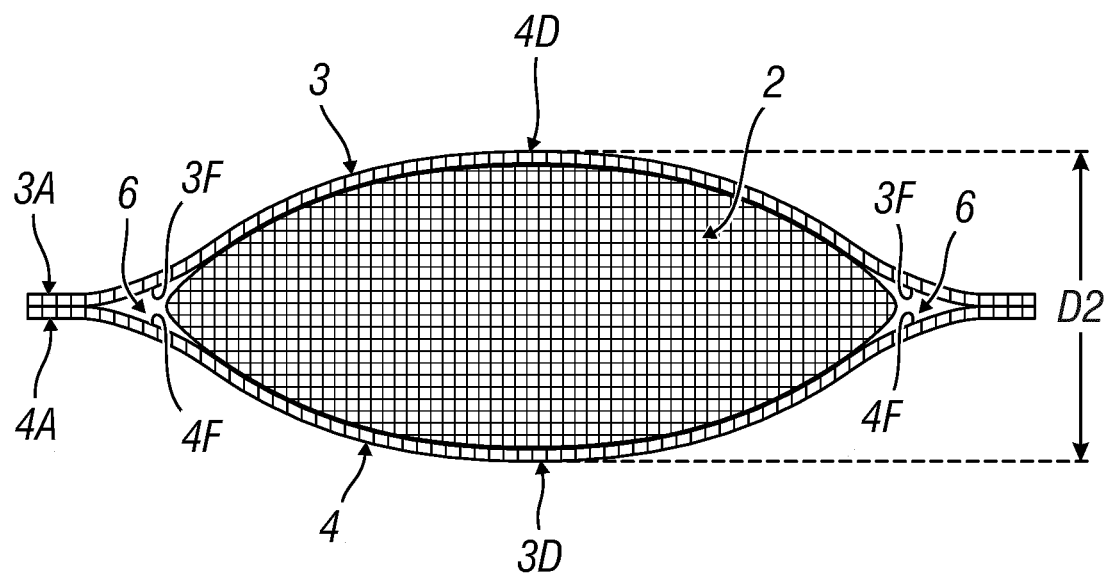
FIG. 4 is a schematic cut view of a container according to the invention.

It is to be noted that, as shown in FIG. 3, in known containers of the aforementioned type (and having injection and delivery walls 3, 4 and a body 2 with the same dimensions of the walls and body of the container according to the invention, shown in FIG. 4), the headspace 6' not filled by the body 2 in the chamber delimited by the injection and delivery walls 3, 4 is much greater than that present in the container according to the invention (shown in FIG. 4). Moreover, in known containers the delivery wall 4 has large edges 4E which are not in contact with the body 2 of the compacted ingredient. As shown in FIG. 3, the empty edges 6' are not only located at the sealing edges 4A, 3A (as in the container according to the invention and shown in FIG. 4), but are also located at the most curved portion 4C of the delivery wall 4, that is precisely in the area of the delivery wall 4 where the unwanted cracks are formed during the outflow of the beverage.

In the context of the invention, the term "headspace" refers to the empty space not filled by the body 2 in the chamber delimited by the injection and delivery walls 3, 4.

Preferably, the headspace 6 inside the chamber 1 is less than 5% of the total volume of said chamber 1, preferably less than 3%.

Preferably, the internal portions 3B, 4B of the delivery walls 3, 4 have a cup shape with the sealing edges 3A, 4A forming a flat and annular edge around said internal cup portions 3B, 4B.

Preferably, this cup shape is revolutionary symmetrical.

Preferably, the injection and the delivery walls 3, 4 have a circular cross section increasing towards the sealing edges 3A, 4A.

Preferably, the injection and the delivery walls 3, 4 have the same shape and dimensions.

Preferably, the compacted ingredient 2 has a tridimensionality shape, substantially identical to the shape of the chamber 1. For example, as shown in FIGS. 3 and 4 the compacted ingredient 2 has the shape of a disc having a thickness decreasing from the center towards its outer edge.

As already stated above, this compacted ingredient 2 does not completely fill the chamber 1.

The fact that the body 2 of the compacted ingredient does not have exactly the same shape and dimensions as the chamber delimited by the injection and delivery walls 3, 4 allows to speed up the automatic operations for the production of the containers, since the operations necessary to insert the compacted ingredient 2 in the container and to form the chamber of the container by sealing together the injection and delivery walls are extremely simplified.

Figure 2:
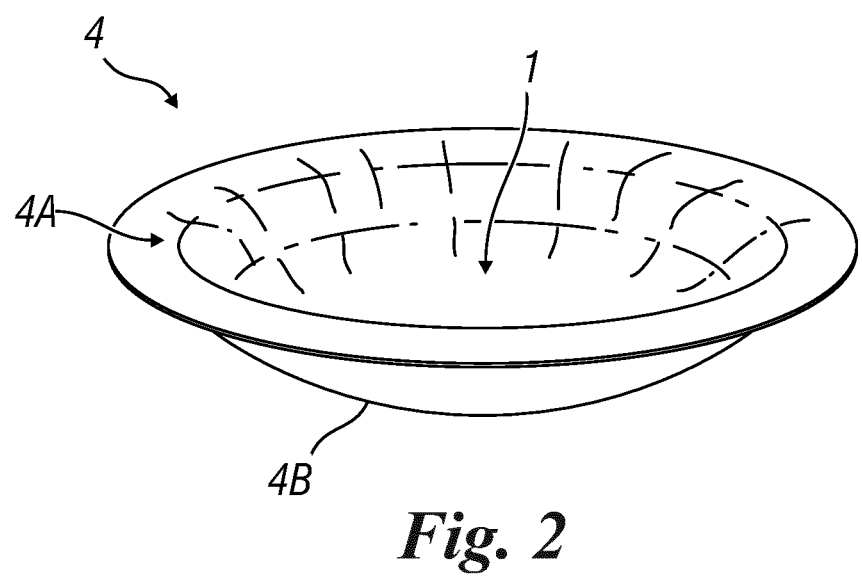
FIG. 2 is a schematic perspective view of one of the two identical walls of the container shown in FIG. 1.

Preferably, the paper layer of the injection and delivery walls 3, 4 is a formable paper layer. As usual for the skilled person, the injection and delivery walls 3, 4 are preferably formed starting from a blank of paper, which is stretched and given the requested shape, preferably a cup shape, as shown in FIG. 2.

Preferably, the paper layer of the injection and delivery walls 3, 4 is a sulfurized paper, that is a paper having intrinsic oxygen barrier features. This type of paper is preferred since an additional oxygen barrier liner does not need to be attached to it.

Preferably, the formable paper layer of the injection and delivery walls 3, 4 has a weight comprised between 50 g/m$^2$ and 200 g/m$^2$, more preferably comprised between 70 g/m$^2$ and 150 g/m$^2$.

If the paper layer of the injection and delivery walls 3, 4 has not intrinsic oxygen barrier features, a usual oxygen barrier liner is attached to this paper layer.

This oxygen barrier liner is made of a known mono- or multi-layer polymeric liner, comprising for example a polymer of fossil or non-fossil origin, or a BioSource polymer, and is preferably attached to the inner surface of the injection and delivery walls 3, 4.

A preferred multilayer barrier liner comprises a core layer having oxygen and/or moisture barrier properties, surrounded by a sealing layer for sealing said barrier liner to the injection and delivery walls 3, 4.

The oxygen barrier liner, by way of non-limiting examples, comprises one or more of following layers:
- an outermost polymeric layer comprising a biodegradable polymer selected within the list of: polybutylene succinate (PBSA/bioPBS), polybutylene adipate terephthalate (PBAT), starch, cellulose derivates, polylactic acid (PLA), polyhydroxyalcanoates (PHA), or a combination thereof;
- a first tie layer comprising a biodegradable modified or functionalized polyolefin;
- a barrier layer comprising a polymer selected within the list of: butenediol vinyl alcohol copolymer (BVOH), polyvinyl alcohol (PVOH) or a combination thereof;
- a second tie layer comprising a biodegradable modified or functionalized polyolefin;
- an innermost polymeric layer comprising a biodegradable polymer selected within the list of: polybutylene succinate (PBSA), polybutylene adipate terephthalate (PBAT), starch, cellulose derivates, polylactic acid (PLA), polyhydroxyalcanoates (PHA) or a combination thereof.

Preferably, the barrier to oxygen for the injection and the delivery walls 3, 4 is selected to provide a sufficient shelf life depending on the nature of the beverage ingredient. For coffee, for example, the shelf life expected may be of 12 months.

Preferably, the injection and delivery walls 3, 4 of the container are made of home compostable materials. The containers according to the invention are normally meant to be recycled in recycling processes that are organized at official recycling facilities according to national regulations (for instance in paper recycling streams, or in general garbage recycling or treatment streams). However, in case the container is placed in nature, in a household compostable waste or in a landfill, said containers are designed with materials that are naturally ready to be degraded by bacteria and in conditions of temperature and humidity that are naturally present in nature. In this way, it is ensured that such containers will not stay in nature and will naturally disappear within a short period of time (a few weeks in principle) within the conditions defined by home composability standards. More precisely, home composability is now well defined on a national level and mainly based on international standard EN 13432; therefore, they do not require to be further defined in-depth in the present specification. Materials or products compliant with these standards can be recognized by a conformity mark stating their home composability. Some examples of home composability certifications at a national level include, but are not limited to, the following. The certifier TUV AUSTRIA BELGIUM offers such a home composability certification scheme, and DIN CERTCO offers a certification for home composability according to the Australian standard AS 5810. Italy has a national standard for composting at ambient temperature, UNI 11183:2006. In November 2015, the French Standard "NF T 51-800 Plastics—Specifications for plastics suitable for home composting" was introduced. This standard is covered in the DIN CERTCO scheme.

The preparation of the beverage is obtained by mixing of the fluid substance with an ingredient contained in the container. Preferably, the ingredients are chosen within the list of roast and ground coffee, compacted or not, soluble powder coffee or leaf tea. Dairy ingredients (e.g., milk or creamer) could also be provided, as well as chocolate, fruit juices, soups, vegetable juices, bouillons, smoothies, purees, coulis, creams, chicory, barley, culinary aid, soup ingredient, infant formula or a combination thereof, in powdered soluble form, liquid concentrated form having various viscosities or in gel form.

Most preferably, the beverage ingredients are roast and ground coffee.

The container of the invention may typically interact with a beverage and/or food preparation device, such as by being fed with a diluent (e.g., hot, cold or ambient water) in the container; such diluent mixes, or interacts otherwise, with the beverage ingredients. With the expression "mixing of the diluent with the beverage ingredient(s)" it should be intended that all the ingredients contained in the container are in a form which is compatible with a generic mixing operation (dissolution, extraction or infusion) with the diluent to obtain the beverage product. Devices of this type are for example those used for the extraction of "Nespresso Pro"® professional capsules.

Preferably, the chamber delimited by the injection and the delivery walls 3, 4 is essential oxygen-free and the headspace inside the container is saturated with an inert gas such as nitrogen, carbon oxide and combinations thereof. Preferably, the container has an internal pressure of gas above atmospheric pressure, due to the gas contained in the coffee and emanating in the cavity after sealing, such as carbon oxide and dioxide.

Figure 5:
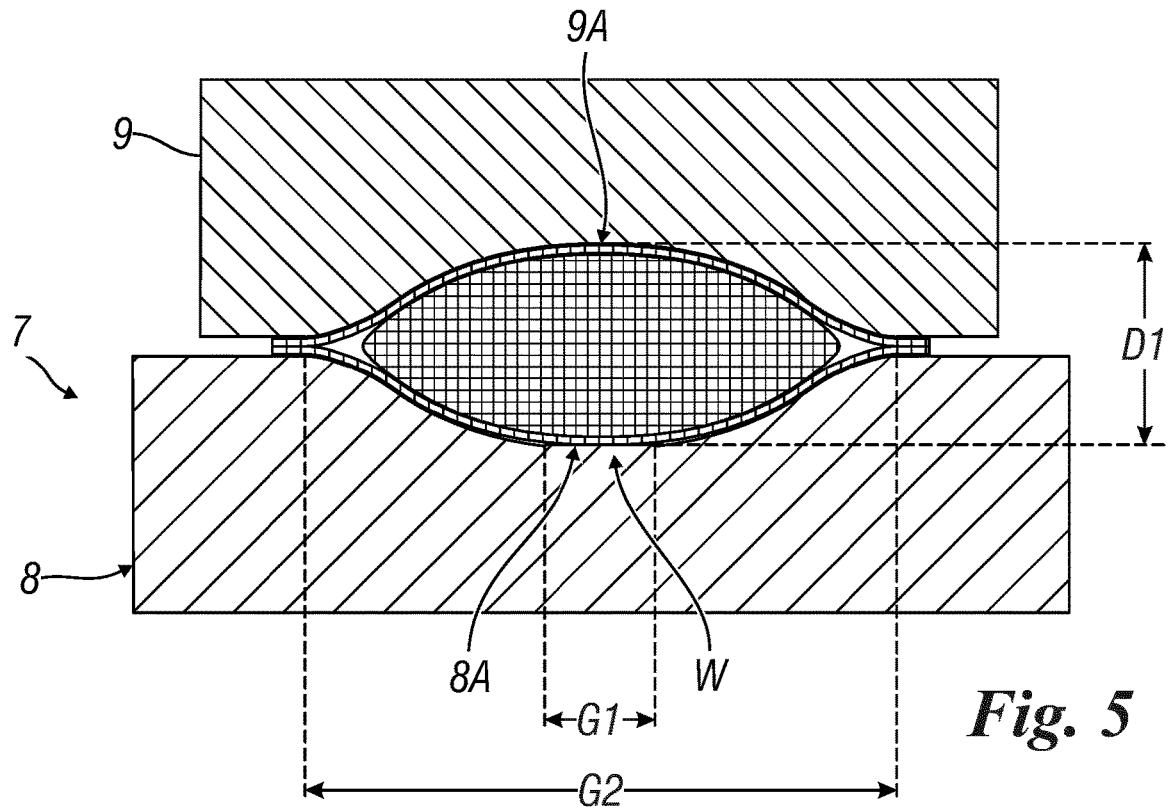
FIG. 5 is a schematic cut view of a sealing station according to the invention, at the end of the sealing step and comprising a container according to the invention and as shown in FIG. 4.
Figure 6:
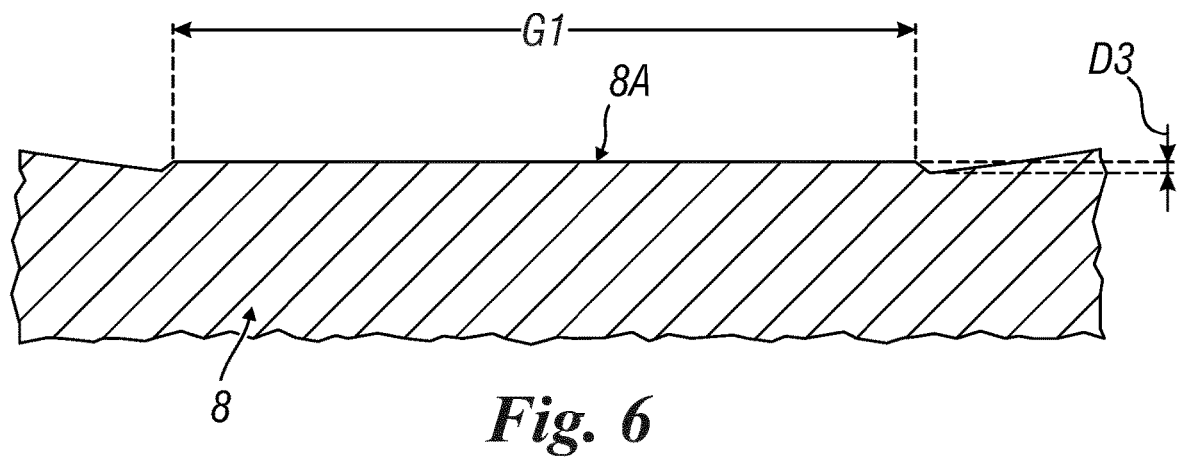
FIG. 6 is an enlarged view of the portion of FIG. 6 indicated by the arrow W, to make the drawing more understandable, the container has not been shown.

A further aspect of the present invention relates to a process for producing a container for the preparation of a beverage in a beverage preparation device. This process comprises the steps of:
a) providing an injection wall 3 of said container comprising a paper layer, said injection wall 3 comprising:

a peripheral sealing edge 3A, and an inner portion 3B capable of being punctured by an injection member of the beverage preparation device for circulating water under pressure inside said container;

b) providing a beverage delivery wall 4 of said container comprising a paper layer, said delivery wall 4 comprising: a peripheral sealing edge 4A, and an inner portion 4B capable of being opened by an opening member of the beverage preparation device when the pressure inside said container presses said inner portion 4B against said opening member, to let the beverage flow out, wherein at least one, preferably both, of said inner portions 3B, 4B of said injection and delivery walls 3, 4 has a cup shape;

c) placing a compacted body 2 of beverage ingredient in the cup-shaped inner portion 3B of the injection or delivery wall 3, 4 (in FIG. 5 the ingredient body 2 is placed in the injection wall 4);

d) placing the injection and delivery walls 3, 4 one above the other such that the sealing edges 3A, 4A of said injection and delivery walls 3, 4 are superimposed, in order to form a preliminary container chamber containing said ingredient body 2 and comprising a preliminary headspace 6' not filled by said compacted ingredient body 2;

e) providing a sealing station 7 comprising: first and second housing elements 8, 9 forming a sealing chamber for housing the inner portions 3B, 4B of said injection and delivery walls 3, 4, wherein said first and second housing elements 8, 9 are configured for being moved towards each other for sealing said edges 3A, 4A, and such that the surfaces of said sealing chamber are in contact with external surfaces of said inner portions 3B, 4B of the injection and delivery walls 3, 4.

According to the invention the process further comprises the steps of:

f) pressing said housing elements 8, 9 against said inner portions 3B, 4B of the injection and delivery walls 3, 4 such as to form a final container chamber having a headspace 6 reduced at least by 10%, with respect to said preliminary headspace 6', and such that in the final container thus obtained, at least 70% of the surface of the compacted beverage ingredient body 2 is in contact with said injection and delivery walls 3, 4;

g) sealing together the edges 3A, 4A of the injection and delivery walls 3, 4, while the inner portions 3B, 4B of said injection and delivery walls 3, 4 are still pressed.

It has been experimentally verified that by first applying a pressing step to the inner portions 3B, 4B of the injection and delivery walls 3, 4, and by subsequently sealing the edges 3A, 4A of these walls 3, 4, while these walls 3, 4 are still pressed, it is possible to reduce the headspace 6 (i.e., the space not filled by the body 2 in the chamber 1) and to increase the area of the internal surface at least of the delivery wall 4 (and preferably also of the injection wall 3) which is in contact with the body 2 of the compacted beverage ingredient.

FIG. 3 shows a container obtained by a usual production process after the sealing step, and FIG. 4 shows the same container obtained by a production process according to the invention after the sealing step. As may be seen by comparing these two figures, the headspace 6' of the "usual" container after the sealing step (shown in FIG. 3), is much greater than the headspace 6 present in the container obtained according to the invention (FIG. 4). In the "usual" container after the sealing step (FIG. 3) the delivery wall 4 has a large part 4E of its most curved portion 4C which is not in contact with the body 2 of the compacted ingredient. The headspace 6' of the "usual" container after the sealing step (FIG. 3) is not only located at the sealing edges 4A, 3A of the delivery and injection walls 4, 3, but is also located at the most curved portion 4B of the delivery wall 4.

As may be seen in FIG. 4, in a container obtained according to the invention the injection and delivery walls 3, 4 are almost continuously in contact with the outer surfaces of the body 2 of compacted ingredient (no head space is present), except for a headspace 6 located substantially only at the sealing edges 3A, 4A of the injection and delivery walls 3, 4.

As already stated above, thanks to the fact: that the headspace 6 in the chamber 1 is very limited, that this headspace 6 is preferably provided substantially only at the sealing edges 3A, 4A, and that the delivery wall 4 is almost entirely in contact with the beverage ingredient (which forms a sort of "cushion"), it has been verified that in the delivery wall 4 no cracks are formed during the beverage outflow, and that the beverage flows out only through the openings which are formed by the interaction of the delivery wall 4 with the opening elements of the beverage preparation device.

Preferably, the inner portions 3B, 4B of the injection and delivery walls 3, 4 are at least partially pressed by said housing elements 8, 9 until the distance D1 between at least first opposing portions 8A, 9A of the two inner surfaces of the first and second housing elements 8, 9 is at least 0.1% lower than the final thickness D2 of corresponding first opposing portions 3D, 4D of a finished container, and preferably at least 1% lower. In this way it is possible to obtain a better contact of the injection and delivery walls 3, 4 with the compacted beverage ingredient body 2.

Preferably, the first opposing portions 8A, 9A, 3D, 4D of the two inner surfaces of the first and second housing elements 8, 9 and of a finished container are central portions of said housing elements 8, 9 and injection and delivery walls 3, 4. In this way it is possible to obtain a better contact of the injection and delivery walls 3, 4 with the compacted beverage ingredient body 2.

Preferably, the first opposing portions 8A, 9A, 3D, 4D are central portions of said housing elements 8, 9 and injection and delivery walls 3, 4, and said inner portions 3B, 4B of the injection and delivery walls 3, 4 are pressed by said housing elements 8, 9 until the maximum distance D1 between the first opposing portions 8A, 9A of the two inner surfaces of the first and second housing elements 8, 9 is at least 0.1% lower than the final maximum thickness D2 of corresponding first opposing portions 3D 4D of a finished container.

Preferably, when said housing elements 8, 9 are pressed against said inner portions 3B, 4B of the injection and delivery walls 3, 4 the superimposed edges 3A, 4A of said injection and delivery walls 3, 4 can at least partially slide over each other. In this way it is possible to obtain a better contact of the injection and delivery walls 3, 4 with the compacted beverage ingredient body 2.

Preferably, in a container obtained according to the invention the headspace 6 inside the chamber delimited by the injection and delivery walls 3, 4 is less than 5% of the total volume of said chamber, preferably less than 3%, and the inner surface of at least the delivery wall 4, and preferably also the inner surface of the injection wall 3, is continuously in contact with the outer surface of the beverage ingredient body 2, except for a terminal portion 4F, 3F of said walls 3, 4, located at the sealing portion 3A, 4A of said walls 3, 4.

As stated before, the injection and the delivery walls 3, 4 have preferably the same cup shape and dimensions and are made by forming a paper layer. As usual for the skilled person, the injection and delivery walls 3, 4 are formed starting from a blank of paper, which is stretched and given the requested shape, preferably a cup shape, as shown in FIG. 2.

As stated before, preferably the paper layer of the injection and delivery walls 3, 4 is a sulfurized paper, that is a paper having intrinsic oxygen barrier features. This type of paper is preferred, since an additional oxygen barrier liner does not need to be attached to it.

As stated before, preferably the formable paper layer of the injection and delivery walls 3, 4 has a weight comprised between 50 g/m² and 200 g/m², more preferably comprised between 70 g/m² and 150 g/m².

As stated before, if the paper layer of the injection and delivery walls 3, 4 has not intrinsic oxygen barrier features, a usual oxygen barrier liner is attached to this paper layer.

The steps and devices necessary for forming the delivery and the injection walls 3, 4, and the compacted ingredient body 2, are well known to the skilled person and will not be described in detail.

After forming the injection and the delivery walls 3, 4, these walls 3, 4 are placed in a sealing station 7 according to the invention.

The present invention relates also to a sealing station 7 for producing a container for the preparation of a beverage in a beverage preparation device.

The sealing station 7 according to the invention comprises:
  an injection wall 3 comprising a paper layer, said injection wall 3 comprising: a peripheral sealing edge 3A, and an inner portion 3B capable of being punctured by an injection member of the beverage preparation device for circulating water under pressure inside said container;
  a beverage delivery wall 4 comprising a paper layer, said delivery wall 4 comprising: a peripheral sealing edge 4A, and an inner portion 4B capable of being opened by an opening member of the beverage preparation device when the pressure inside said container presses said inner portion 4B against said opening member, to let the beverage flow out, wherein at least one, preferably both, of said inner portions 3B, 4B of said injection and delivery walls 3, 4 has a cup shape;
  a compacted body 2 of beverage ingredient housed in a container chamber formed by placing the injection and delivery walls 3, 4 one above the other such that the sealing edges 3A, 4A of said injection and delivery walls 3, 4 are superimposed, wherein said container chamber before sealing said sealing edges 3A, 4A together comprises a preliminary headspace 6' not filled by said compacted ingredient body 2.

The sealing station comprises:
  first and second housing element 8, 9 forming a sealing chamber for housing the inner portion 4B of said injection and delivery walls 3, 4 wherein said first and second housing elements 8, 9 are configured for being moved towards each other for sealing said edges 3A, 4A, and such that the surfaces of this sealing chamber press the external surfaces of the inner portions 3B, 4B of the injection and delivery walls 3, 4.

According to the invention, at least one of the inner surfaces of the first and/or second housing elements 8, 9 of the sealing station comprise a portion 8A projecting towards the inside of the sealing chamber delimited by the housing elements 8, 9 and increasing the pressure exerted by the surfaces of said first and second housing elements 8, 9 on the external surfaces of the inner portions 3B, 4B of the injection and delivery walls 3, 4, such as to form a final container chamber having a headspace 6 reduced at least by 10%, with respect to said preliminary headspace 6', and such that in the final container thus obtained, at least 70% of the surface of the compacted beverage ingredient body 2 is in contact with said injection and delivery walls 3, 4.

It has been experimentally verified that by providing the housing elements 8, 9 with a projecting portion having the features stated above, the injection and delivery walls 3, 4 are tightly pressed against the compacted ingredient body 2 and remain in contact with that body after the edges 3A, 4A of these walls are sealed together.

Preferably, the projecting portion 8A is provided only at the inner surface of the first housing element 8 which houses the delivery wall 4.

Preferably, the projecting portion 8A is provided only at a central portion of the surface of one or both the housing elements 8, 9.

Preferably, the projecting portion 8A has a disc shape having a diameter G1 comprised between 10% and 80%, more preferably about 65%, the diameter G2 of the housing elements 8, 9.

Preferably, the projecting portion 8A has a height D3 comprised between 0.5 mm and 2 mm, more preferably about 1 mm.

Preferably, the projecting portion 8A has a diameter G1 comprised between 5 mm and 30 mm, more preferably about 25 mm.

Preferably, the first and second housing elements 8, 9 are dimensioned in such a way that, during the sealing of the edges 3A, 4A of the injection and delivery walls 3, 4, the distance D1 between at least first opposing portions 8A, 9A of the two inner surfaces of the first and second housing elements 8, 9 is at least 0.1% lower than the final thickness D2 of corresponding first opposing portions 3D, 4D of a finished container, and preferably at least 1% lower.

Preferably, the distance between at least first opposing portions 8A, 9A of the two inner surfaces of the first and second housing elements 8, 9 is the maximum distance D1 between the two inner surfaces of the first and second housing elements 8, 9 and said final thickness is the final maximum thickness of the container.

The edges 3A, 4A of the injection and delivery walls 3, 4 are sealed in a usual way for the skilled person. Therefore, this sealing step will not be described in detail.

It should be understood that various changes and modifications to the presently preferred embodiment of the container and the process for producing a container, described herein will be apparent to those skilled in the art. Such changes and modifications can be made without departing from the scope of the present invention covered by the appended claims. For example, the injection and/or the delivery walls 3, 4, and or the body 2 formed by the compacted ingredient, may have a different shape. According to another modification the first and second housing elements of the sealing station can be moved with respect to each other in a different way from what has been described above, in any case in a usual way for those skilled in the art.

The invention claimed is:

1. A process for producing a container for preparing a beverage in a beverage preparation device, the process comprising the steps of:
   a. providing an injection wall of the container comprising a paper layer, the injection wall comprising: a peripheral sealing edge and an inner portion capable of being punctured by an injection member of the beverage preparation device for circulating water under pressure inside the container;

b. providing a beverage delivery wall of the container comprising a paper layer, the beverage delivery wall comprising: a peripheral sealing edge and an inner portion capable of being opened by an opening member of the beverage preparation device when the pressure inside the container presses the inner portion against the opening member to let the beverage flow out, wherein at least one of the inner portions of the injection wall and the inner portion of the beverage delivery wall has a cup shape;

c. placing a compacted body of beverage ingredient in the inner portion of the injection wall or the inner portion of the beverage delivery wall;

d. placing the injection and delivery walls one above the other such that the sealing edges of the injection and delivery walls are superimposed, in order to form a preliminary container chamber containing the compacted body and comprising a preliminary headspace not filled by the compacted body;

e. providing a sealing station comprising: first and second housing elements forming a sealing chamber for housing the inner portions of the injection wall and the inner portion of the beverage delivery walls, wherein the first and second housing elements are configured for being moved towards each other for sealing the peripheral sealing edge of the injection wall and the peripheral sealing edge of the beverage delivery wall, and wherein surfaces of the sealing chamber are in contact with external surfaces of the inner portions of the injection wall and the inner portion of the beverage delivery wall;

f. pressing the first and second housing elements against the inner portion of the injection wall and the inner portion of the beverage delivery wall so as to form a final container chamber having a headspace reduced at least by 10% with respect to the preliminary headspace, and so that in the container thus obtained, at least 70% of an external surface of the compacted body of beverage ingredient is in contact with the injection wall and the beverage delivery wall, wherein the inner portion of the injection wall and the inner portion of the beverage delivery wall are at least partially pressed by the first and second housing elements until a distance between first opposing portions of two inner surfaces of the first and second housing elements is at least 0.1% lower than a final thickness of corresponding first opposing portions of a finished container; and g. sealing together the sealing edge of the injection wall and the sealing edge of the beverage delivery wall, while the inner portions of the injection wall and the inner portion of the beverage delivery wall are still pressed.

2. The process according to claim 1, wherein the inner portions of the injection wall and the inner portion of the beverage delivery wall are pressed by the first and second housing elements until a maximum distance between the first opposing portions of the two inner surfaces of the first and second housing elements is at least 0.1% lower than a final maximum thickness of the corresponding first opposing portions of the finished container.

3. The process according to claim 1, wherein the inner portions of the injection wall and the inner portion of the beverage delivery wall are at least partially pressed by the first and second housing elements until the headspace of the final container chamber is less than 5% of a total volume of the final container chamber.

4. A sealing station for carrying out a sealing step of a process for producing a container for the preparation of a beverage in a beverage preparation device, wherein the container comprises:

an injection wall comprising a paper layer, the injection wall comprising: a peripheral sealing edge, and an inner portion capable of being punctured by an injection member of the beverage preparation device for circulating water under pressure inside the container;

a beverage delivery wall comprising a paper layer, the beverage delivery wall comprising: a peripheral sealing edge, and an inner portion capable of being opened by an opening member of the beverage preparation device when the pressure inside the container presses the inner portion against the opening member to let the beverage flow out, wherein at least one of the inner portions of the injection wall and the inner portion of the beverage delivery wall has a cup shape; and a compacted body of beverage ingredient housed in a container chamber formed by placing the injection wall and the beverage delivery wall one above the other such that the sealing edges of the injection wall and the beverage delivery wall are superimposed, wherein the container chamber before sealing the sealing edge of the injection wall and the sealing edge of the beverage delivery wall together comprises a preliminary headspace not filled by the compacted body;

the sealing station comprising:

first and second housing elements forming a sealing chamber for housing the inner portion of the injection wall and the inner portion of the beverage delivery wall, wherein the first and second housing elements are configured for being moved towards each other for sealing the sealing edge of the injection wall and the sealing edge of the beverage delivery wall, wherein surfaces of the sealing chamber press the external surfaces of the inner portions of the injection wall and the inner portion of the beverage delivery wall, and wherein at least one of an inner surfaces of the first housing element and an inner surface of the second housing elements comprises a projecting portion projecting towards an inside of the sealing chamber delimited by the first and second housing elements and increasing pressure exerted by the inner surfaces of the first and second housing elements on the external surfaces of the inner portions of the injection wall and the inner portion of the beverage delivery wall, so as to form a final container chamber having a headspace reduced at least by 10% with respect to the preliminary headspace, and so that in the container thus obtained, at least 70% of an external surface of the compacted body of beverage ingredient is in contact with the injection wall and the beverage delivery wall.

5. The sealing station according to claim 4, wherein the projecting portion:

is provided only at the inner surface of the first housing element which houses the beverage delivery wall; or is provided only at a central portion of the inner surface of one or both of the first and second housing elements; and/or has a disc shape having a diameter that is between 10% and 80% of a diameter of the first and second housing elements;

has a height between 0.5 mm and 2 mm; and has a diameter between 5 mm and 30 mm.

6. The sealing station according to claim 4, wherein the first and second housing elements are dimensioned in such a way that, during the sealing of the sealing edge of the injection wall and the sealing edge of the beverage delivery wall, a distance between first opposing portions of the inner surfaces of the first and second housing elements is at least 0.1% lower than a final thickness of corresponding first opposing portions of a finished container.

* * * * *